United States Patent Office 3,131,138
Patented Apr. 28, 1964

3,131,138
PRODUCTION OF GRAFT COPOLYMERS
Jean Durup, Paris, and Michel Magat, Bievres, France, assignors to Centre National de la Recherche Scientifique, Ministere de l'Education, Paris, France
No Drawing. Filed Mar. 18, 1959, Ser. No. 800,079
Claims priority, application France Aug. 28, 1958
13 Claims. (Cl. 204—154)

This invention relates to new and useful improvements in the production of graft copolymers. The invention more particularly relates to an improvement in the process for obtaining graft copolymers by subjecting a polymer to high-energy ionizing radiation in the presence of oxygen and thereafter contacting the irradiated polymer with a monomer.

In copending application Serial No. 553,156, filed December 14, 1955, and French Patent No. 1,130,100, filed May 31, 1955, the process is described for producing graft polymers using ionizing radiation. In accordance with this process, a polymer is subjected to ionizing radiation in the presence of oxygen to thereby form "active centers," i.e., points of activation or reactivity, at which the grafting will take place. The irradiated polymer is then contacted with a monomer polymerizable by free radicals so that a graft copolymer is produced having a trunk corresponding to the starting polymer, which was irradiated, and branches corresponding to polymers of the monomer with which the contacting was effected.

The ionizing radiation, which may be characterized as high-energy ionizing radiation, is radiation having a wave length much shorter than that of ultra-violet light and includes beta rays, gamma rays, neutrons, accelerated electrons and heavy particles, X-rays, and the like. This type of radiation may be produced from atomic piles, electron or particle accelerated, radio-active isotopes and X-ray equipment.

It is believed that the irradiation of the base polymer with the high-energy ionizing radiation in the presence of oxygen may form in the body of the polymer peroxide or hydroperoxide groups which are relatively unstable and which subsequently break up, liberating free radicals which remain fastened to the polymer chain constituting the "active centers" capable of initiating the polymerization of the monomeric material to be grafted.

The type of ionizing radiation and the total dose to be used depends upon several factors including the properties which the resulting graft copolymer is intended to possess and whether or not for a given polymer mass the grafting is only desired as a surface treatment or is to be extended to a substantial depth into the mass.

Certain polymers, however, do not readily produce these "active centers" upon irradiation with the high-energy ionizing radiation in the presence of oxygen. In accordance with the above set forth theory, it is believed this is due to the fact that these polymers are resistant to peroxidation.

Thus, for example, polystyrene requires relatively high doses to form graft copolymers when treated in accordance with the above mentioned process. Without such high doses the hydroperoxide of polystyrene is formed in insufficient amount to permit the obtaining of sufficient grafts.

One object of this invention is to facilitate the obtaining of graft copolymers from polymers such as styrene, which do not readily produce "active centers" upon irradiation with high-energy ionizing radiation in the presence of oxygen. This, and still further objects, will become apparent from the following description:

In accordance with the invention it has been surprisingly discovered that graft copolymers may be readily produced in a practical manner according to the above mentioned process from polymers, such as polystyrene, which do not readily produce "active centers" upon irradiation with high-energy ionizing radiation in the presence of oxygen, if the irradiation of the polymer to form the "active centers" is effected with the polymer in contact with a material capable of producing, when irradiated with high-energy ionizing radiation in the presence of oxygen, a high yield of free radicals without itself undergoing a chain oxidation.

After the irradiation in this manner, and prior to the contacting with the monomer, the said material may be removed from the radiated polymer. The material, which is capable of producing a high yield of free radicals when irradiated with ionizing radiation in the presence of oxygen and which is maintained in contact with the polymer during the irradiation, is preferably a solvent for the polymer and the polymer is preferably dissolved therein or swollen therewith. Preferred examples of this material include carbon tetrachloride and other per halogenated alkanes, such as $CBrCl_3$, $CFCl_3$, $C_2Br_6$, and others. The removal of the said material after the irradiation and prior to the contacting of the irradiated polymer with the monomer may be effected in any known or desired manner, as for example by precipitation, evaporation or the like.

In order to allow practical operation, it is critical that the material, capable of producing a high yield of free radicals when irradiated with high-energy ionizing radiation in the presence of oxygen, does not undergo a chain oxidation under irradiation. Thus, the use of chloroform, which will undergo a chain oxidation under irradiation, is not suitable, as, when operating therewith, a rapid depletion of oxygen occurs, and the upper limit of radiation intensity permissible is too low.

When operating, however, with carbon tetrachloride and other poly-chlorinated alkanes, it is possible to obtain the highest yields of peroxides even when using relatively high irradiation intensities; any intensity between 10 and 1000 roentgens per minute is convenient, the effiicent range of doses is $10^4$ to $10^6$ roentgens.

The stabilization of the material, such as chloroform, which undergoes a chain oxidation with the use of alcohols, phenols or amines, in order to prevent the chain oxidation, is not helpful, as this stabilization also leads to a decrease of the polymer peroxide yield.

When operating in accordance with the invention, it has been found that the best peroxide yields are obtained with relatively high polymer concentrations with an optimum concentration being about 50 grams of polystyrene per liter of solution.

The grafting rate may be characterized from the rate of grafting initiation by decomposition of the polymeric peroxides.

Table I represents for different concentrations the grafting initiation rate per liter of irradiated solution and per gram of irradiated polystyrene, respectively.

TABLE I

Rate of Grafting Initiation (Moles of Polystyryl Radicals Per Hour of Grafting)

| Concentration of polystyrene in irradiated solution, g./l. | Rate per liter of irradiated solution and per roentgen | | Rate per gram of irradiated polystyrene and per roentgen | |
|---|---|---|---|---|
| | At 20° C. | At 40° C. | At 20° C. | At 40° C. |
| 10 | $1.6.10^{-12}$ | | $16.10^{-4}$ | $74.10^{-14}$ |
| 30 | $2.3.10^{-12}$ | $0.74.10^{-11}$ | $7.7.10^{-4}$ | |
| 50 | $2.3.10^{-12}$ | $4.2.10^{-11}$ | $4.6.10^{-4}$ | $84.10^{-14}$ |
| 100 | $1.6.10^{-12}$ | $2.4.10^{-11}$ | $1.6.10^{-4}$ | $24.10^{-14}$ |
| 600 | $1.5.10^{-12}$ | $0.98.10^{-11}$ | $0.25.10^{-4}$ | $1.6.10^{-14}$ |
| (Swollen polymer) (Dry polymer) | $1.2.10^{-12}$ | $0.45.10^{-11}$ | $0.11.10^{-4}$ | $0.4.10^{-14}$ |

When operating in accordance with the invention, it is believed that the peroxide groups formed upon the irradiation of material capable of producing free radicals when irradiated with high-energy ionizing radiation in the presence of oxygen attach themselves laterally to the base or trunk polymer, which leads to the formation of true graft copolymers rather than block copolymers. Graft copolymers have a base or trunk of the starting irradiated polymer to which polymerized branches of the added polymer are joined, whereas block copolymers generally consist of longitudinally connected blocks or chains of the polymer units forming the copolymer.

For example, when using polystyrene as the base or trunk polymer which is irradiated, the radicals produced from the material capable of producing free radicals when irradiated remove alpha hydrogen atoms from the styrene in accordance with the following scheme.

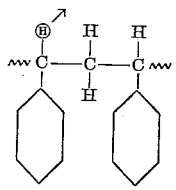

A macroradical is thus formed, which will take on oxygen in accordance with the following reaction scheme:

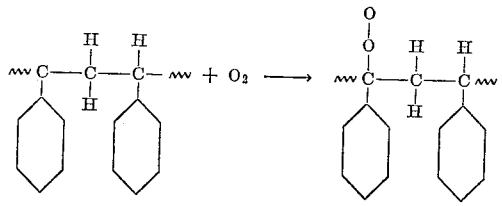

This product is then stabilized with the formation of the "active centers."

In all other respects the process is effected in the manner described in the said application 553,156 or French Patent 1,130,100.

Thus, the oxygen present during irradiation is preferably present in the form of the ambient oxygen in the air or oxygen dissolved and inherently included in the polymer solution. An agitation of the solution or bubbling of oxygen may be useful.

The monomers with which the irradiated polymers are contacted include any monomer which is capable of being polymerized by free radicals. The term "monomer" is used in its broadest sense and designates a starting polymerizable material and not necessarily a monomeric unit from a structural standpoint. Examples of suitable monomers include lower olefins, such as ethylene and further polymerizable polyene, such as polyolefins and vinyl compounds, such as vinyl chloride and vinyl carbazole, dienes, for example butadiene, acrylic derivatives, such as acrylonitrile, acrylamide, and many others.

Any grafting temperature may be used between 10° and 120° C., the higher the temperature, the more rapid will be the grafting but the shorter the branches.

The graft copolymers produced in accordance with the invention may be in any desired form as, for example, in the form of powder, grains, sheets, rings, semi-finished or finished articles, such as molded articles and the like, many of these products constituting novel industrial products.

The following examples are given by way of illustration and not limitation:

EXAMPLE 1

A solution of 10 grams per liter of polystyrene (of an initial average molecular weight of 380,000) in carbon tetrachloride is formed and is then irradiated in the presence of air with gamma rays with a dose of 580,000 roentgens at the rate 110 roentgens per minute. The irradiated polymer (the average molecular weight of which has dropped to 41,000 due to its partial degradation) is then isolated, for instance, by repeated precipitation and evaporation, and dissolved at a rate of 57 grams per liter in a mixture comprising 25% acrylonitrile and 75% benzene.

After being set aside for 40 hours at 40° C., it is found that 49% of the acrylonitrile has polymerized, the grafted copolymer obtained comprising 93 to 95% acrylonitrile grafted onto the polystyrene.

Attempts to extract the initial polystyrene with a solvent for the latter (chloroform or benzene) are unsuccessful (negative), proving that grafting has actually taken place.

The polyacrylonitrile homopolymer formed, as well as the grafted copolymers containing the smallest amounts of polystyrene may be extracted with an aqueous solution of sodium perchlorate.

EXAMPLE 2

A solution of 50 grams per liter of polystyrene (of an initial average molecular weight of 100,000) in carbon tetrachloride is formed and irradiated in the presence of air with gamma rays with a dose of 137,000 roentgens at the rate of 110 roentgens per minute.

The irradiated polymer (the average molecular weight of which has dropped to 42,000) is isolated by successive precipitations and evaporation and is dissolved to a dilution of 70 grams per liter in a mixture comprising 25% acrylonitrile and 75% benzene.

After being set aside for 40 hours at 40° C., it is found that 34% of the acrylonitrile has polymerized, the grafted copolymer obtained comprising 50 to 60% acrylonitrile grafted onto the polystyrene.

EXAMPLE 3

A sample of polystyrene swollen with 0.57 cm.³ carbon tetrachloride per gram of polymer is irradiated in the presence of air with gamma rays with a dose of 249,000 roentgens at the rate of 100 roentgens per minute.

The swollen polymer is dissolved after irradiation, without removing the solvent, in pure methyl methacrylate to a dilution of 61 grams polystyrene per liter of solution.

After being set aside for 45 hours at 40° C., a mixture of grafted copolymer and polymethyl methacrylate homopolymer is obtained; the grafted part, very hard and insoluble in chloroform at 10 g. per liter (but soluble at 1 g./l., indicating that no crosslinking occurred), is roughly separated and weighted. It is found that 2.8 grams polymethyl methacrylate are grafted on each gram polystyrene; in good agreement with this result, the polystyrene content of the grafted copolymer is spectroscopically determined as 23% in weight.

While the invention has been described in detail with reference to certain specific embodiment, various changes and modifications fall within the spirit of the invention and scope of the appended claims. These would become apparent to the skilled artisan. The invention is, therefore, only intended to be limited by the appended claims or their equivalents, wherein we have attempted to claim all inherent novelty.

We claim:

1. In the process for producing graft polymers, in which a polymer is subjected to high-energy ionizing radiation in the presence of oxygen with an effective radiation dosage to form active centers and thereafter the irradiated polymer is contacted with a monomer polymerizable by free radicals, the improvement for effecting the grafting on polymers which do not readily produce active centers upon irradiation with high-energy ionizing radiation in the presence of oxygen which comprises subjecting the polymer to the high-energy ionizing radiation while in contact with a compound capable of producing, when irradiated with high-energy ionizing radiation in the presence of oxygen, a high yield of free radicals without itself undergoing a chain oxidation.

2. Improvement according to claim 1, which includes removing said compound prior to said contacting with said monomer.

3. Improvement according to claim 1, in which said compound is a solvent for said polymer.

4. Improvement according to claim 3, which includes removing said compound prior to said contacting with said monomer.

5. Improvement according to claim 1, in which said compound is a poly-halogenated alkane.

6. Improvement according to claim 5, which includes removing said group member prior to the contacting of the irradiated polymer with said monomer.

7. Improvement according to claim 1, in which said polymer is in solution in said compound in a concentration of about 50 grams per liter.

8. A process for the production of graft polymers from polystyrene, which comprises irradiating polystyrene with an effective dosage of high-energy ionizing radiation to form active centers while in contact with oxygen and a poly-halogenated alkane solvent capable of producing when irradiated with high energy ionizing radiation in the presence of oxygen a high yield of free radicals without undergoing a chain oxidation, and thereafter contacting the irradiated polystyrene with a monomer capable of polymerizing in the presence of free radicals and recovering the graft polymer formed.

9. Improvement according to claim 8, in which the poly-halogenated alkane is carbon tetrachloride and in which the polystyrene concentration in carbon tetrachloride is equal to about 50 grams per liter of solution.

10. Process according to claim 9, which includes removing the solvent prior to said contacting with the monomer.

11. Process according to claim 10, in which said monomer is a member selected from the group consisting of acrylonitrile and methyl methacrylate.

12. Improvement according to claim 1, in which said compound is carbon tetrachloride.

13. Process according to claim 8 in which the poly-halogenated alkane is carbon tetrachloride.

References Cited in the file of this patent

FOREIGN PATENTS

| | | |
|---|---|---|
| 1,130,100 | France | Jan. 30, 1957 |
| 213,942 | Australia | Mar. 21, 1958 |

OTHER REFERENCES

Progress Report on Fission Products Utilization, V (March 1953), page 10.

Modern Plastics, volume 30, No. 11 (July 1953), pages 116, 176 (I).

Modern Plastics, volume 32, No. 10 (June 1955), page 252 (II).

Ballantine et al.: Progress on Fission Products Utilization, IX (BNL 414), October 1956, pages 2 and 14.